US012336659B2

(12) United States Patent
Galdeano (10) Patent No.: US 12,336,659 B2
(45) Date of Patent: Jun. 24, 2025

(54) PORTABLE GRILLING DEVICE

(71) Applicant: Carlos Galdeano, Belmont, CA (US)

(72) Inventor: Carlos Galdeano, Belmont, CA (US)

( * ) Notice: Subject to any disclaimer, the term of this patent is extended or adjusted under 35 U.S.C. 154(b) by 973 days.

(21) Appl. No.: 17/077,829

(22) Filed: Oct. 22, 2020

(65) Prior Publication Data

US 2022/0125242 A1    Apr. 28, 2022

(51) Int. Cl.
*A47J 37/07* (2006.01)

(52) U.S. Cl.
CPC ....... *A47J 37/0763* (2013.01); *A47J 37/0786* (2013.01); *A47J 2037/0795* (2013.01)

(58) Field of Classification Search
CPC ............ A47J 37/0786; A47J 2037/0795; A47J 37/0694
See application file for complete search history.

(56) References Cited

U.S. PATENT DOCUMENTS

| 3,905,286 | A   | * | 9/1975 | Le Grady ............... | A47J 37/07 99/450 |
| 2010/0132689 | A1 | * | 6/2010 | Contarino, Jr. ......... | A47J 37/07 126/25 |
| 2015/0030742 | A1 | * | 1/2015 | Jameson ............. | A47J 37/0694 426/523 |

FOREIGN PATENT DOCUMENTS

EP    2639515 A1 *  9/2013  ............ A47J 37/067

OTHER PUBLICATIONS

Machine translation of EP 2639515 A1 performed on Oct. 11, 2023, Nather (Year: 2013).*

* cited by examiner

*Primary Examiner* — Ibrahime A Abraham
*Assistant Examiner* — Kevin Guanhua Wen
(74) *Attorney, Agent, or Firm* — FisherBroyles, LLP; Rob L. Phillips (57) ABSTRACT

A portable grill having multiple grill sections attachable to one another to form a grill member; and a pair of support standards each attachable to one edge of the assembled grill member to elevate the grill member for positioning over charcoal or other fuel for cooking thereunder. The individual components of the portable grill can be packaged into a small case. The grill is collapsible/stackable, portable, with V-shaped stainless-steel grill grates to improve cooking performance and conditions for individuals and families who love to grill and barbecue outdoors. The grill design prevents food from ever touching the surface of an actual existing grill and avoids fire flare-ups.

17 Claims, 13 Drawing Sheets

Fig. 13

PORTABLE GRILLING DEVICE

FIELD OF THE INVENTION

The embodiments of the present invention relate to a portable grilling device comprising an easily assembled and dissembled multi-sectional grill top and support standards.

BACKGROUND

Camping, beach trips, picnics and similar getaways are quite popular and even more so during a pandemic. One article that can improve such getaways is a grill to prepare some hot food. Unfortunately, most grills are cumbersome and hard to transport so people must rely on grills at the getaway locations or transport the cumbersome grill.

Moreover, public grills are extremely dirty. The average barbecue grill contains 1.7 million microbes per square centimeter—124 percent more than a toilet seat according to a recent British study.

It would be advantageous to develop a portable grill that may be easily transported, assembled, used, disassembled and which is also sanitary, not prone to flare ups and easy to clean.

SUMMARY

Accordingly, a first embodiment of the present invention comprises multiple grill sections attachable to one another to form a single grill member; and a pair of standards each attachable to one edge of the assembled grill member to elevate the grill member for positioning over charcoal or other fuel for cooking thereunder. The components of the grill can be packaged into a small case. In one embodiment, the case measures 14.1"×. 6.4"×1.5".

In one embodiment, the grill is packaged with two different sets of standards to provide varying grill member elevations and angles. In one embodiment, the grill comprises three individual grill sections attachable to one another to form the assembled grill member. In one embodiment, the grill sections comprise V-shaped grates to catch fat and other drippings that may cause a flare-up.

Other variations, embodiments and features of the present invention will become evident from the following detailed description, drawings and claims.

DETAILED DESCRIPTION

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The grill sections and standards of embodiments of the present invention may be made using any suitable materials including, but not limited to, alloys, composites, metals, polymers, ceramics, and combinations thereof as long as the final product is not impacted by the heat of the fuel source during cooking. The grill sections and standards may be fabricated using any suitable technique including, but not limited to, milling, machining, molding, casting, 3D printing and combinations thereof.

Figure 1:
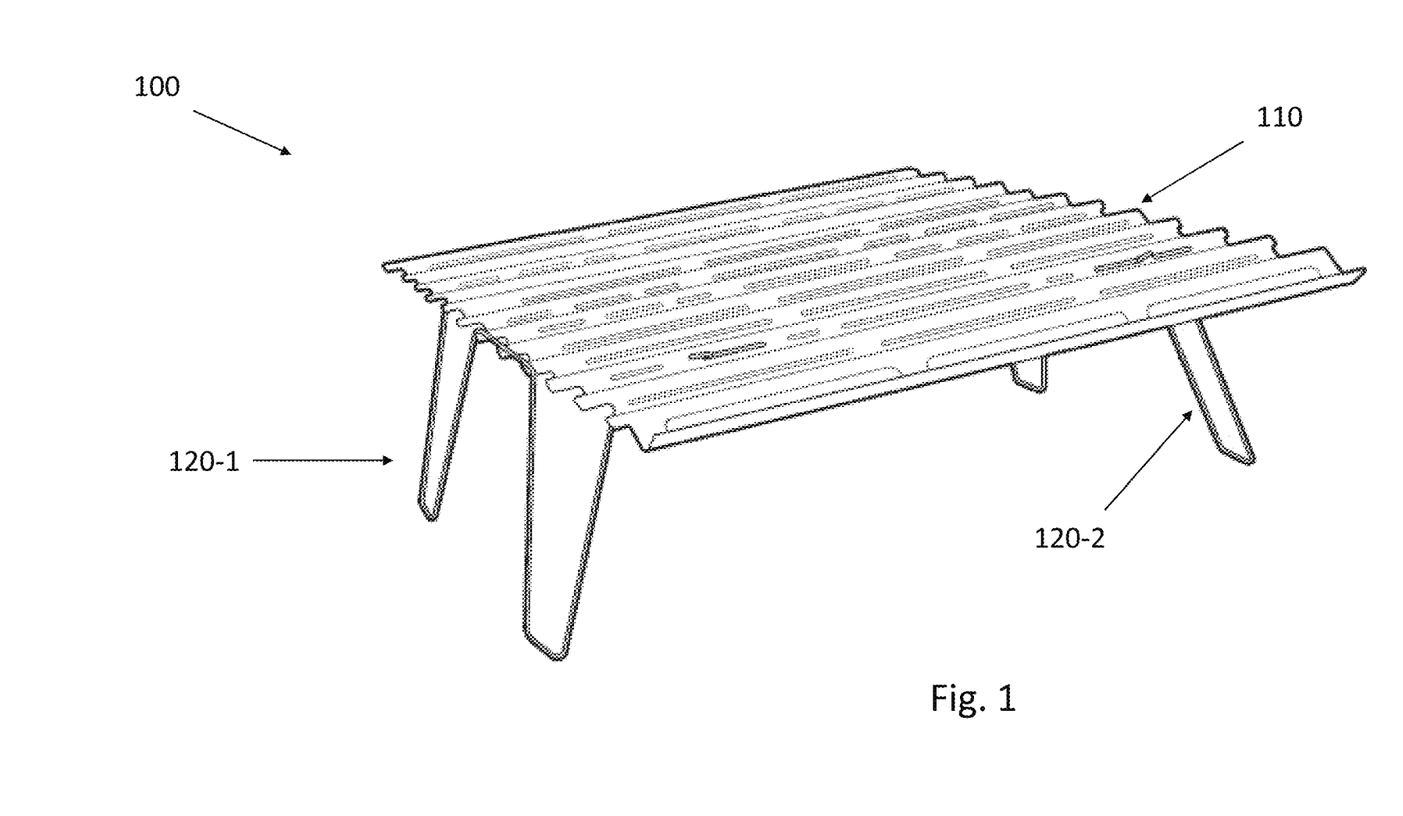
FIG. 1 illustrates a perspective view of an assembled grill according to the embodiments of the present invention.

FIG. 1 shows a first embodiment of an assembled grill 100 comprising in general a grill member 110 and standards 120-1, 120-2. In this configuration, the grill 100 is elevated so that charcoal, wood or other fuel may be positioned thereunder to cook/heat food placed on the upper surface of the grill member 110. It is conceivable that the heights of the standards may be varied depending on the specific fuel being used (e.g., wood tends to take up more space than charcoal). A grill kit may come with a plurality of standards with differing heights for such purposes.

Figure 2:
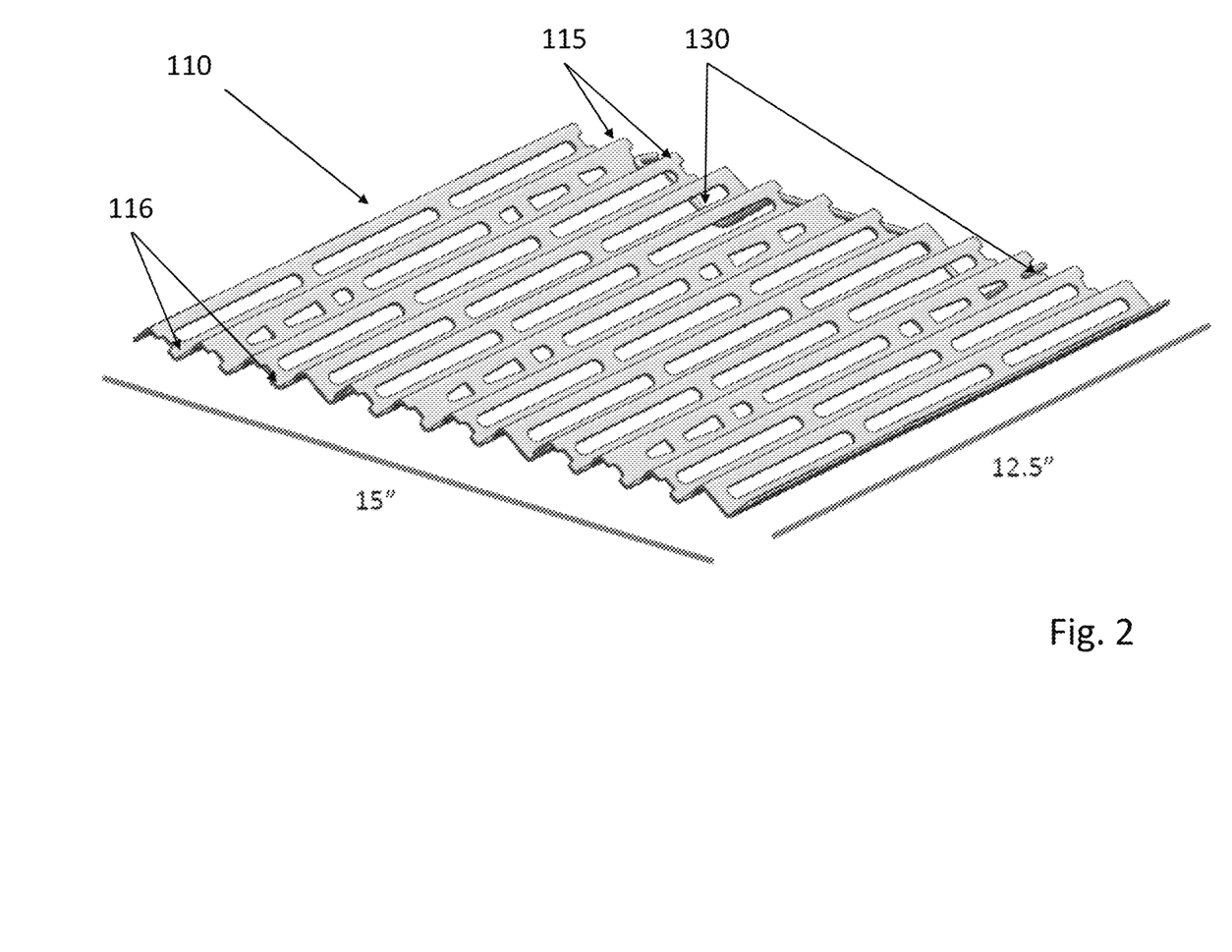
FIG. 2 illustrates a perspective view of a grill member according to the embodiments of the present invention.
Figure 3:
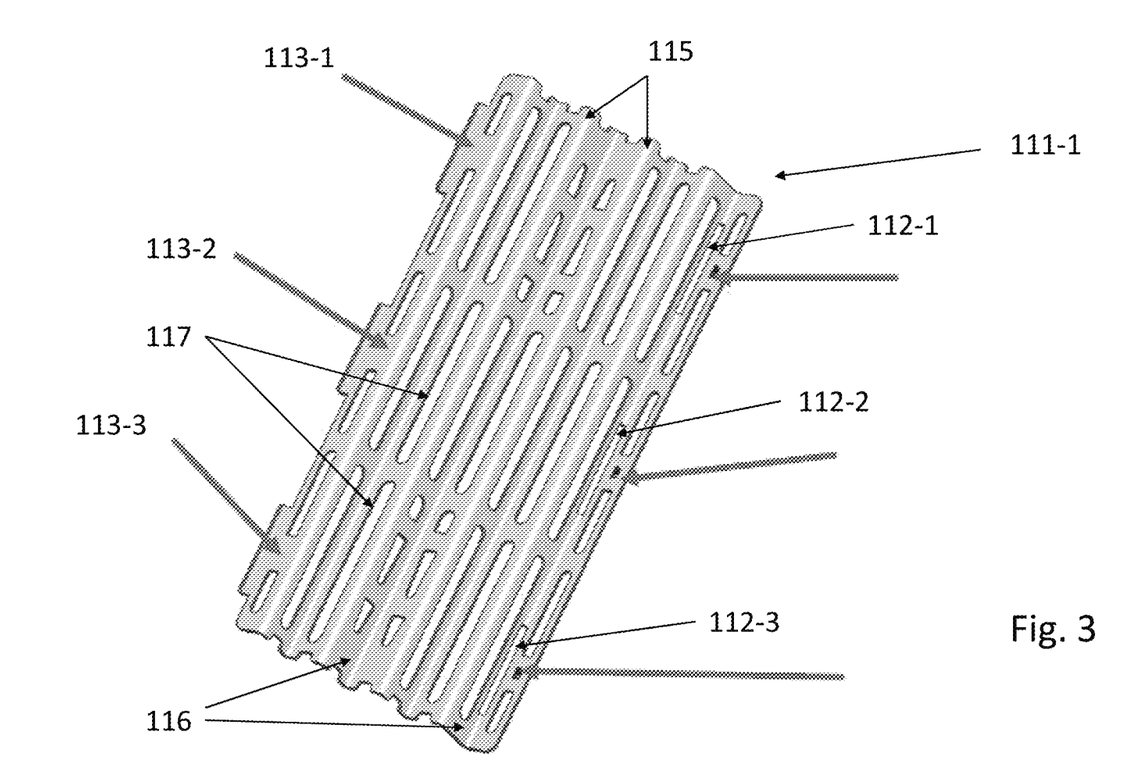
FIG. 3 illustrates an upper surface of a grill section and associated markings according to the embodiments of the present invention.
Figure 5:
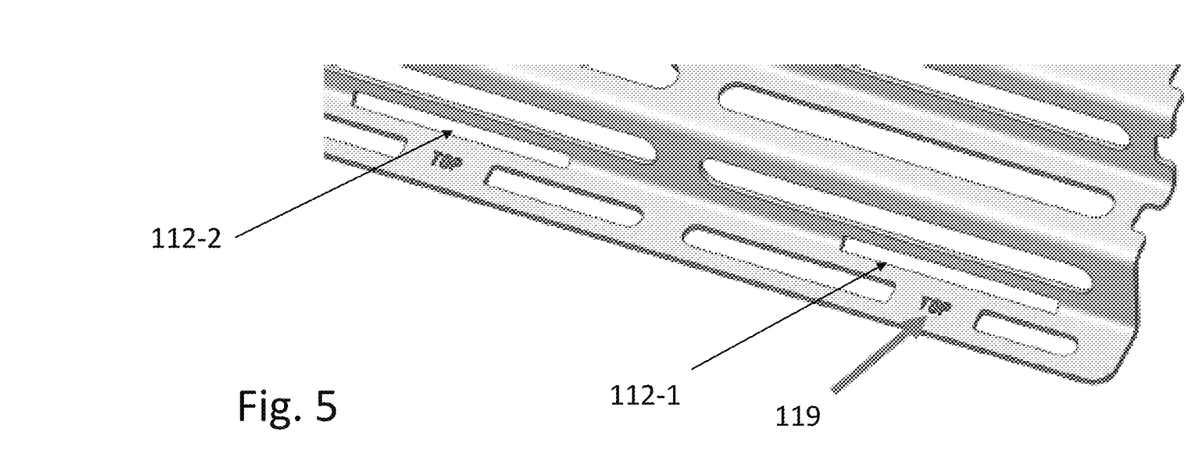
FIG. 5 illustrates a close up view of the upper surface of the assembled grill member according to the embodiments of the present invention.

FIGS. 2 and 3 show the grill member 110 with a short standard 130 attached and grill sections 111-1 through 111-3, respectively, which attach to one another to form the assembled grill member 110. As shown, the grill sections 111-1 through 111-3 include a series of peaks 115 and valleys 116 (V-shaped grates) and openings 117 for the passage of heat from a burning fuel source. The valleys 116 of the V-shaped grates capture fats and other drippings to prevent them from causing flare ups. The grill 100 may then be angled to allow the drippings to flow off the V-shaped grates away from the fuel source. While three grill sections 111-1 through 111-3 are shown, more or less may be used to assemble the grill member 110. FIG. 5 shows an upper surface of a grill section 111-3 with markings 119 indicative of the upper surface thereby providing the user with an easy way to properly assemble the grill member 110.

Figure 4:
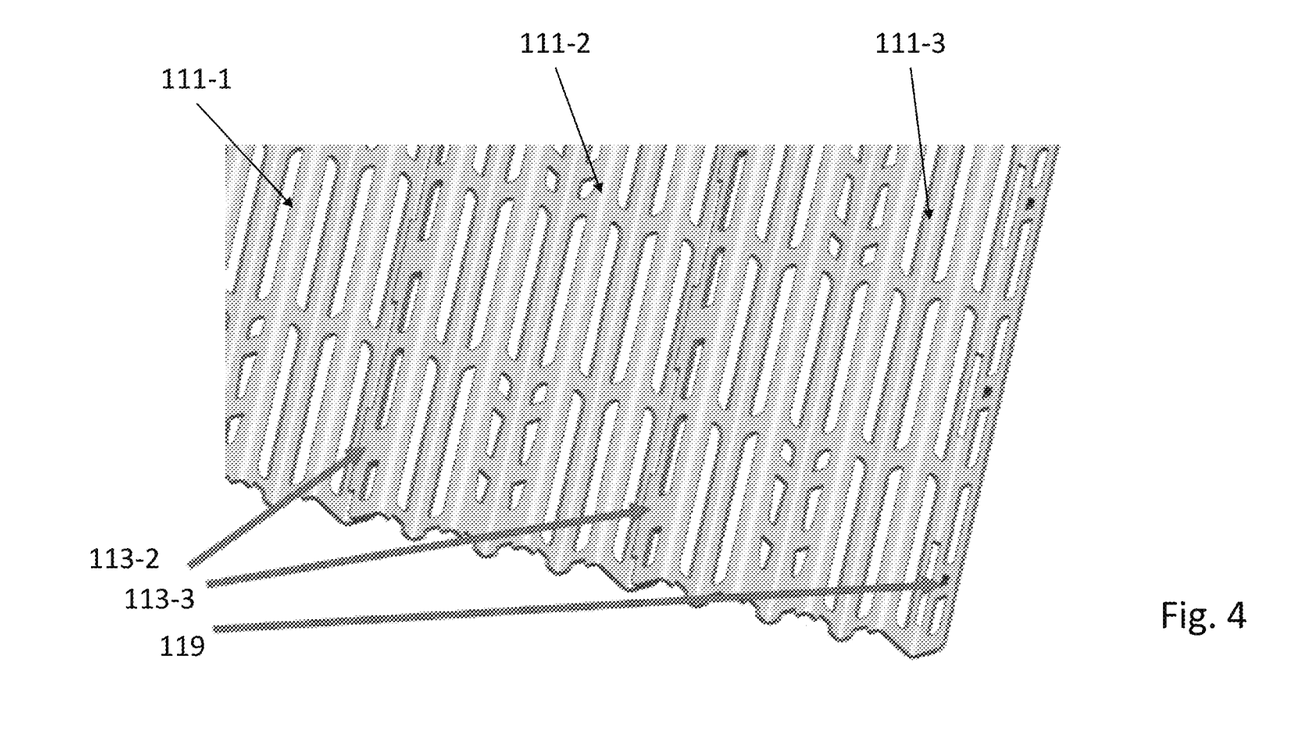
FIG. 4 illustrates a grill section of the type used to form the grill member of FIG. 2 according to the embodiments of the present invention.

As shown in FIG. 4, attachment of neighboring grill sections 111-1 to 111-3, for example, comprises a series of slots 112-1 through 112-3 and corresponding elongate protuberances 113-1 through 113-3 positioned to slide into and generally lock within the series of slots 112-1 through 112-3. While three slots 112-1 through 112-3 and corresponding protuberances 113-1 through 113-3 are shown, it is possible that one or more slots and protuberances may accomplish the same. The locking action is dictated by the positioning of the slots 112-1 through 112-3 at the bottom of a valley of a first grill section and the protuberances 113-1 through 113-3 being positioned at the bottom of a valley of a second grill section. In one embodiment, the protuberances 113-1 through 113-3 are angled so to when inserted into the slots 112-1 through 112-3 they apply a frictional locking force. In other embodiments, the neighboring grill sections may attach to one another using attachments means such as heat resistant magnets, grooves and pins, spring-biased pins and holes, etc.

Figure 7:
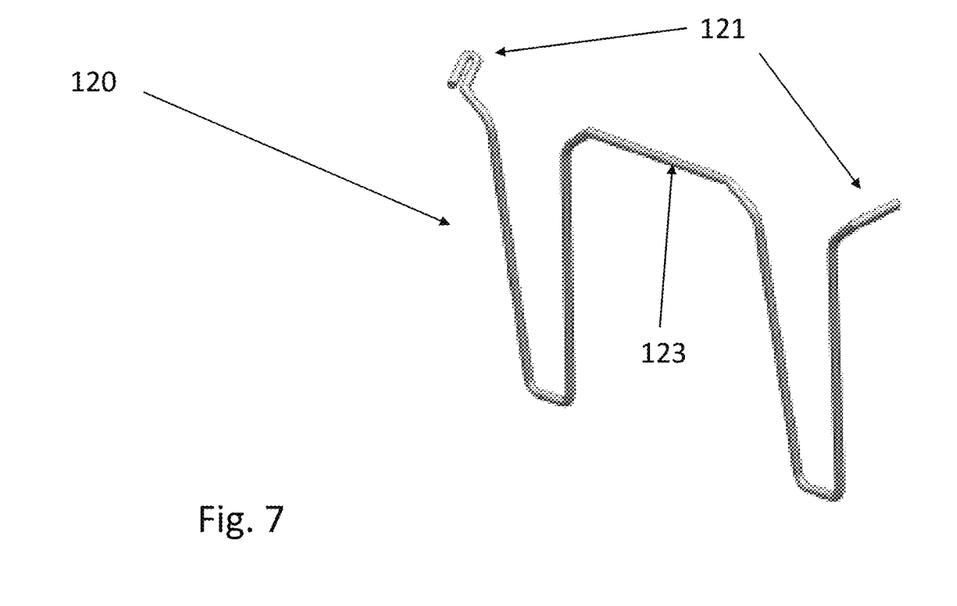
FIG. 7 illustrates a tall standard according to the embodiments of the present invention.
Figure 9:
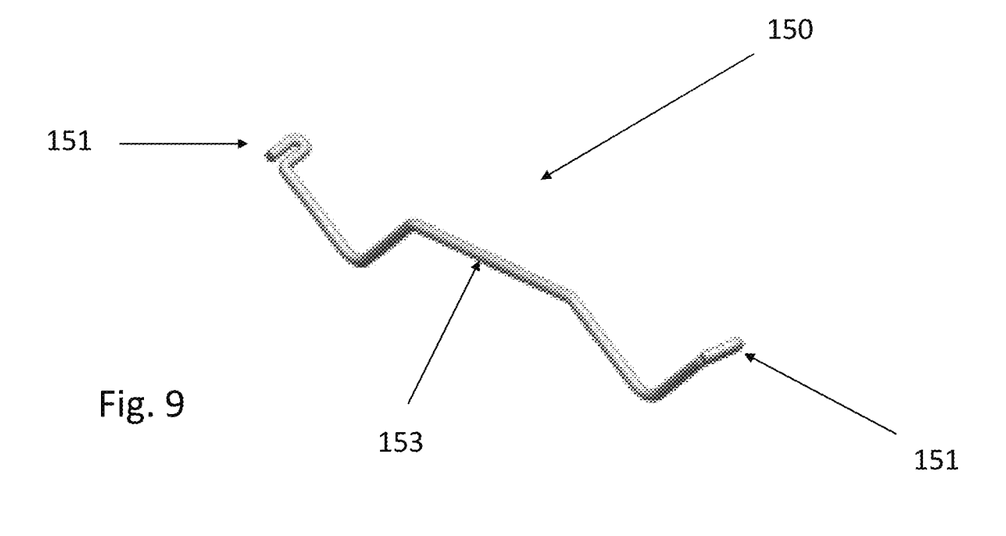
FIG. 9 illustrates a short standard according to the embodiments of the present invention.
Figure 11:
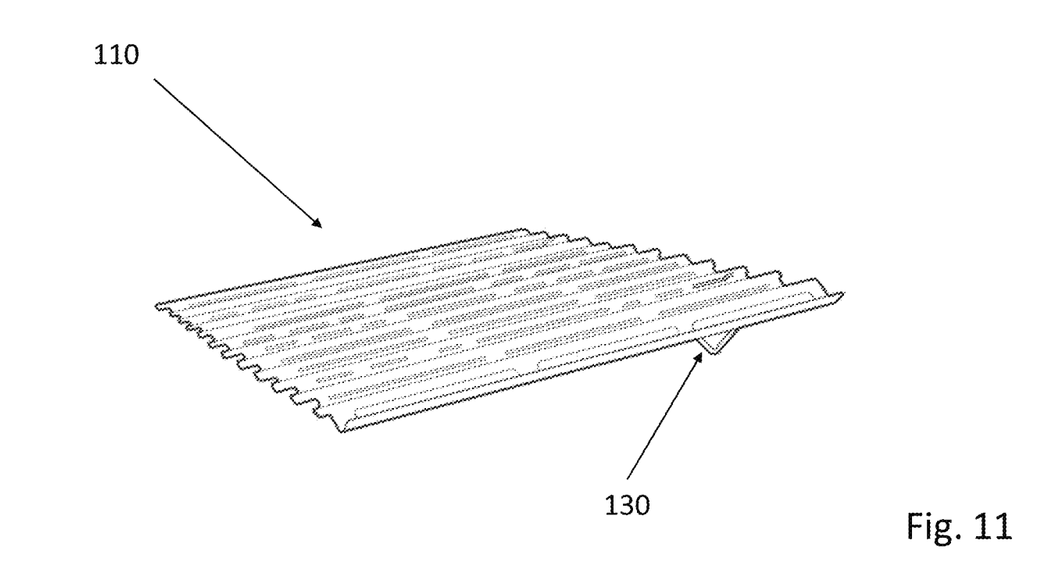
FIG. 11 illustrates the assembled grill with a single short standard attached according to the embodiments of the present invention.
Figure 12:
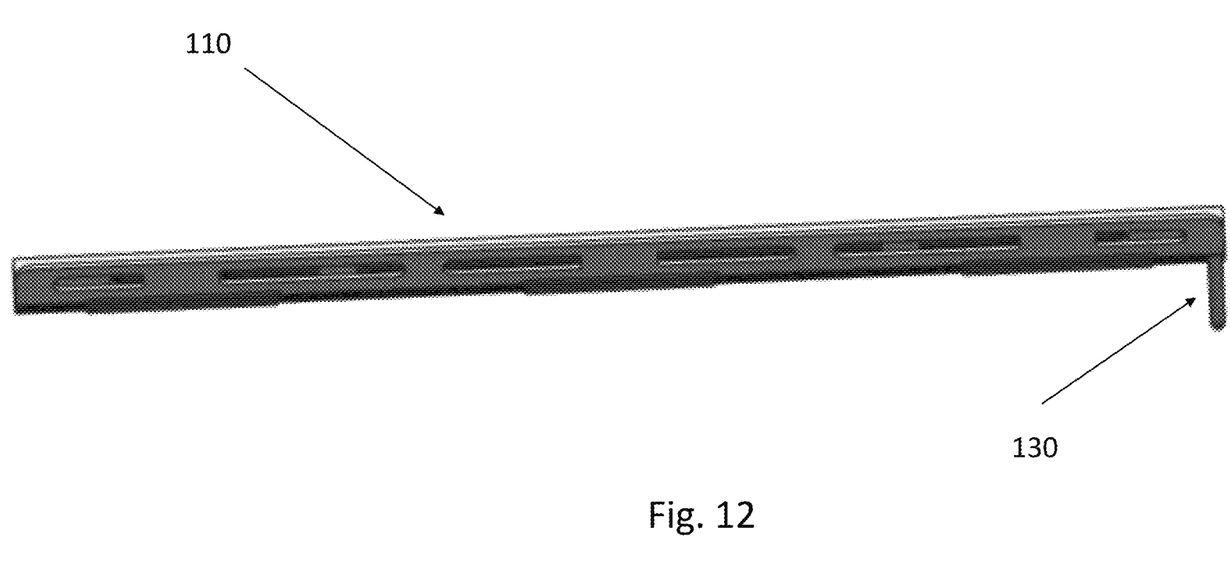
FIG. 12 illustrates a side view of the assembled grill with the short standard attached according to the embodiments of the present invention.

FIG. 7 shows an exemplary tall standard 120 while FIG. 9 shows an exemplary short standard 150. Tall standard 120 corresponds to those shown with the assembled grill 100 in FIG. 1. In one embodiment, the short standard 150 is used to create an angled upper grill surface as shown in FIGS. 11 and 12. This embodiment is intended for use with an existing grill structure. A pair of tall standards 120 are intended for a grill being used independently without any other necessary structure. Those skilled in the art will recognize that varying size standards may be used individually, collectively as desired by the user.

Figure 6:
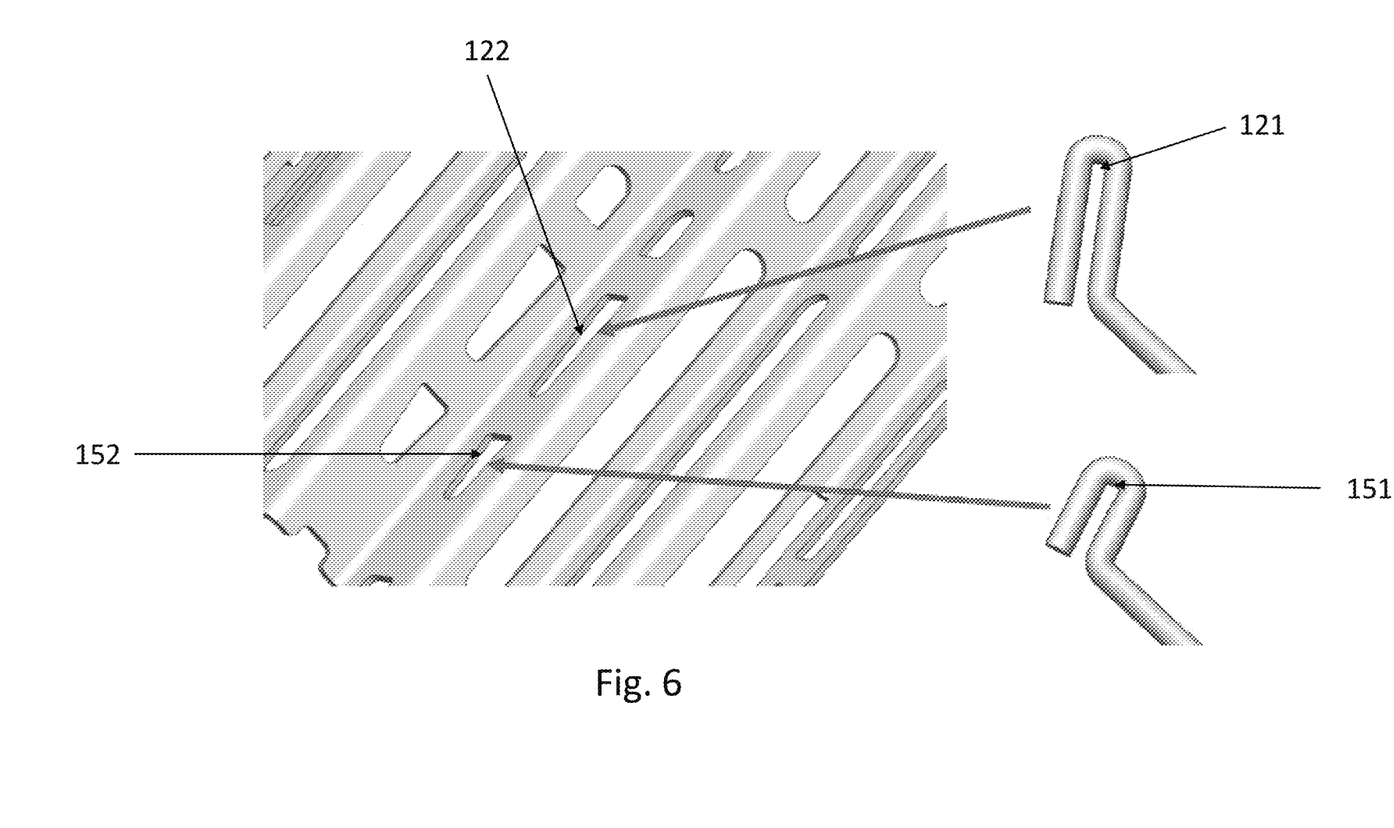
FIG. 6 illustrates portions of standards and grill sections to which the standards attach according to the embodiments of the present invention.
Figure 8:
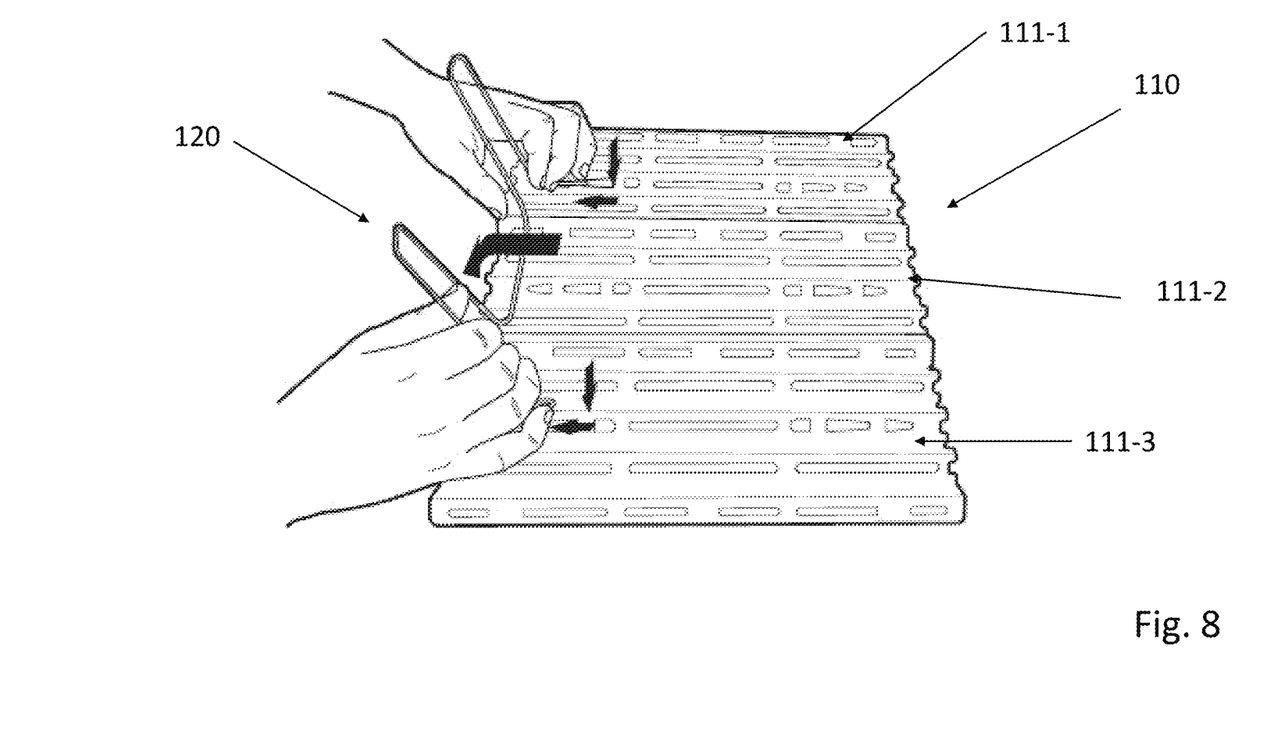
FIG. 8 illustrates the tall standard being attached to a grill section according to the embodiments of the present invention.
Figure 10:
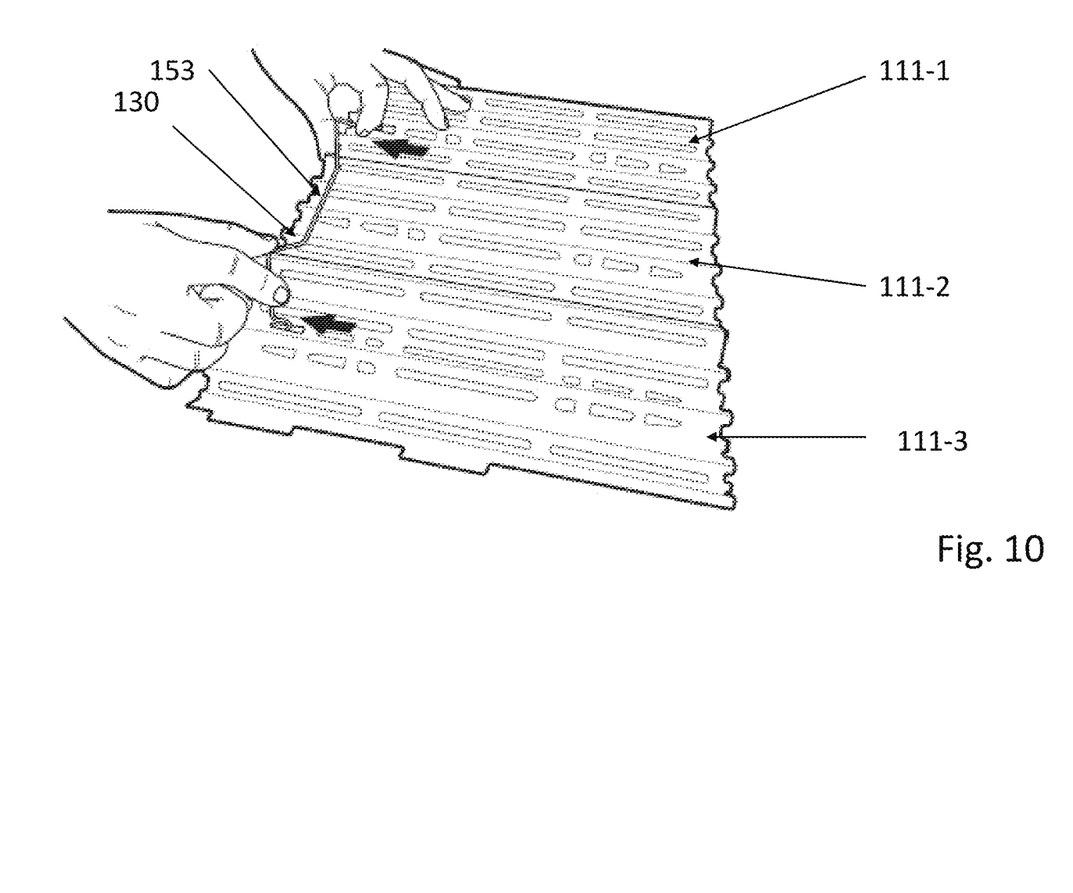
FIG. 10 illustrates the short standard being attached to a grill section according to the embodiments of the present invention.

Regardless of height, each of the standards 120, 150 include spaced ends in the form U-shaped hooks 121, 151. As shown in FIG. 6, the U-shaped hooks 121, 151 are positioned and configured to insert into, slide along and generally lock into, corresponding elongated apertures 122, 152. In one embodiment, the U-shaped hooks 121, 151 are angled inward to provide additional attachment force to the grill member reducing the likelihood of inadvertent disengagement. The hooks 121, 151 can be replaced with other types of connectors. FIGS. 8 and 10 show a long standard 120 and short standard 150 being attached to a grill member 101. Depending on the embodiment, when standard 120, 150 is attached to the grill member, a horizontal standard member 123, 153 may rest beneath an edge of the grill member, extend above an edge of the grill member or run along the edge of the grill member.

Figure 13:
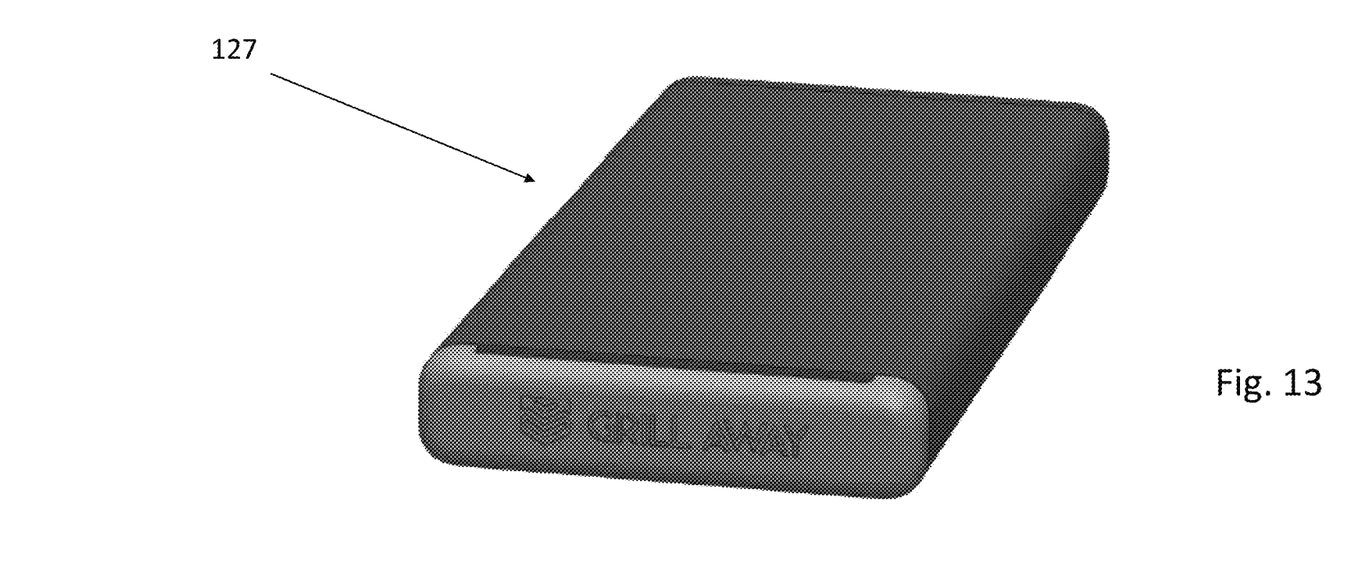
FIG. 13 illustrates a perspective view of a container for a disassembled grill according to the embodiments of the present invention.

FIG. 13 shows an exemplary container 127 for holding and transporting the grill. In one embodiment, the case measures 14.1"× 6.4"×1.5". The peaks and valleys design of the grill sections 111-3 through 111-3 allow the grill sections 111-1 and 111-3 to be stacked on one another creating a small cross-section and footprint.

The embodiments of the present invention improve the outdoor cooking experience without the typical mess, cross contamination and time involved. The grill 100 is collapsible/stackable, portable, with V-shaped stainless-steel grill grates to improve cooking performance and conditions for individuals and families who love to grill and barbecue outdoors. The design prevents food from ever touching the surface of an actual existing grill and avoids fire flare-ups. Made of light portable makes the grill 100 ideal for quick packing and cleaning. A portable box made from dishwasher safe material serves to package the components of the grill 100.

Although the invention has been described in detail with reference to several embodiments, additional variations and modifications exist within the scope and spirit of the invention as described and defined herein.

I claim:

1. A portable grill comprising:
   a plurality of grill sections, said grill sections formed of peaks and valleys, said grill sections each having one or more slots near a first edge and one or more protuberances near an opposite second edge and said one or more slots near said first edge and said one or more protuberances near said opposite second edge are positioned on bottoms of valleys of said plurality of grill sections, said plurality of grill sections attachable to one another to form a grill member via engagement of said one or more slots of a first grill section and said one or more protuberances of a second grill section wherein when engaged said opposite second edges overlap with said first edges combining to form a valley with one or more points of engagement; and
   one or more support standards each having a pair of spaced connectors configured to insert into apertures within said grill member thereby attaching said one or more support standards to said grill member to elevate at least a portion thereof.

2. The portable grill of claim 1 further comprising a plurality of openings in said grill sections for passage of heat.

3. The portable grill of claim 1 wherein said spaced connectors are U-shaped hooks.

4. The portable grill of claim 3 wherein said spaced U-shaped hooks are angled inward.

5. The portable grill of claim 1 wherein said one or more multiple protuberances are angled to increase engagement with said one or more slots.

6. The portable grill of claim 1 wherein said grill sections comprises plurality of V-shaped grates.

7. A portable grill comprising:
   a plurality of grill sections, said grill sections comprising a series of peaks and valleys, said grill sections each having a series of slots near a first edge and a series of corresponding protuberances near an opposite second edge and said series of slots near said first edge and said series of corresponding protuberances near said opposite second edge are positioned on bottoms of valleys of said plurality of grill sections, said plurality of grill sections attachable to one another to form a grill member via engagement of said series of slots of a first grill section and said series of protuberances of a second grill section wherein when engaged said opposite second edges overlap with said first edges combining to form a valley with one or more points of engagement; and
   a pair of support standards each having a pair of spaced U-shaped hooks configured to insert into apertures on opposite edges of said grill member thereby attaching said one or more support standards to said grill member to elevate the same.

8. The portable grill of claim 7 further comprising a plurality of openings in said grill sections for passage of heat.

9. The portable grill of claim 7 wherein said spaced hooks are angled inward.

10. The portable grill of claim 7 wherein said series of protuberances are angled to increase engagement with said series of slots.

11. The portable grill of claim 7 wherein said grill sections comprises plurality of V-shaped grates.

12. A portable grill comprising:

three grill sections each comprising a series of peaks and valleys, said grill sections each having one or more slots near a first edge and one or more corresponding protuberances near an opposite second edge and said one or more slots near said first edge and said one or more corresponding protuberances near said opposite second edge are positioned on bottoms of valleys of said plurality of grill sections, and wherein one or more protuberances of a first grill section are engageable to one or more corresponding slots of a second grill section and one or more protuberances of said second grill section are engageable to one or more corresponding slots of a third grill section to collectively form a grill member wherein when engaged an opposite second edge of said first grill section overlaps with a first edge of said second grill section combining to form a first valley with one or more points of engagement and wherein when engaged an opposite second edge of said second grill section overlaps with a first edge of said third grill section combining to form a second valley with one or more points of engagement; and one or more support standards each having a pair of connectors configured to insert into apertures on opposite edges of said grill member thereby attaching said one or more support standards to said grill member to elevate portions of the same.

13. The portable grill of claim 12 further comprising a plurality of openings in said grill sections for passage of heat.

14. The portable grill of claim 12 wherein said connectors are U-shaped hooks.

15. The portable grill of claim 14 wherein said U-shaped hooks are angled inward.

16. The portable grill of claim 12 wherein said one or more protuberances are angled to increase engagement with said one or more slots.

17. The portable grill of claim 12 wherein said grill sections comprises plurality of V-shaped grates.

* * * * *